Figures 1, 2:
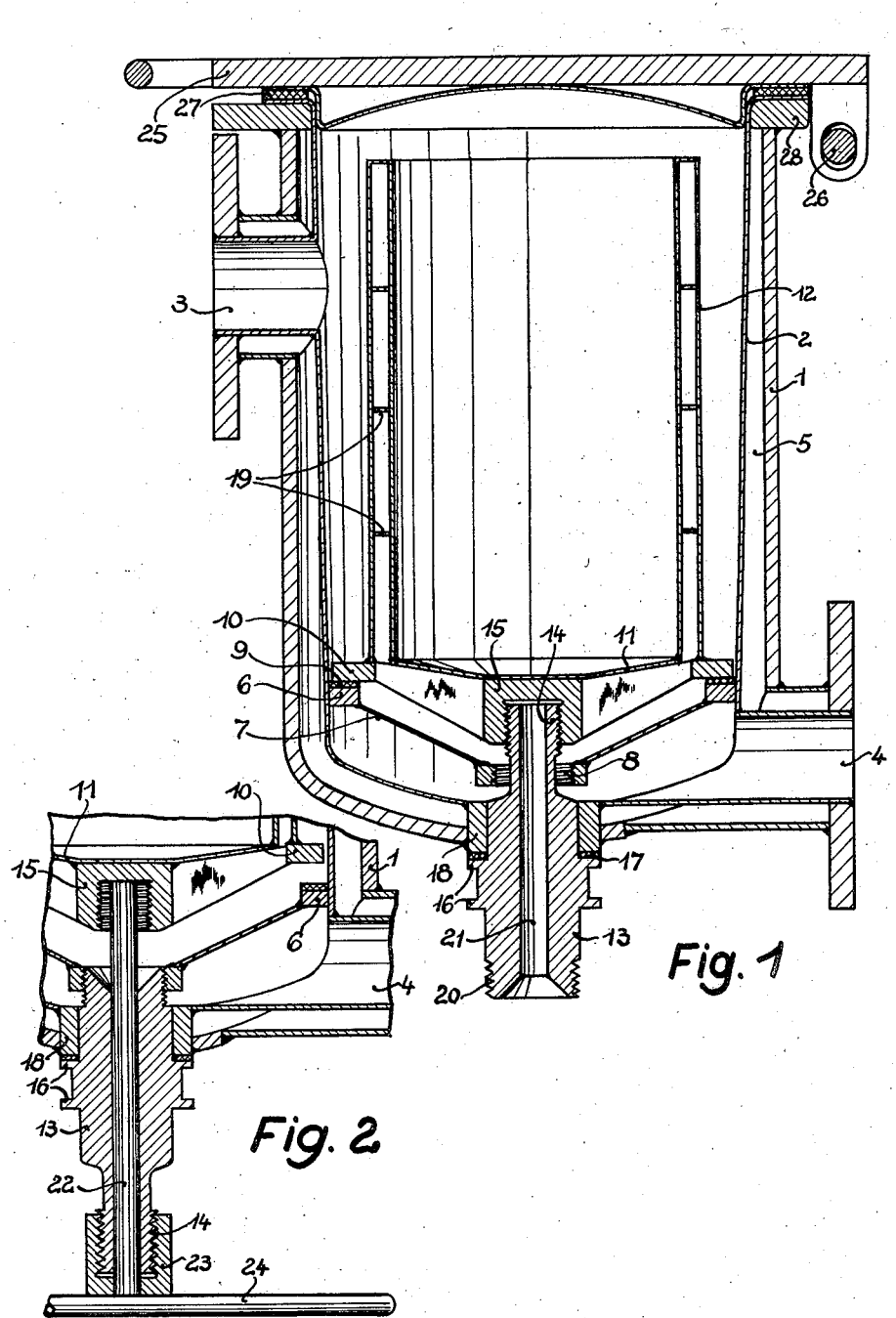

Oct. 14, 1958 R. KAHL 2,856,075

FILTER

Filed July 12, 1955

INVENTOR
Rudolf Kahl
BY
Cushman, Darby & Cushman
ATTORNEYS

United States Patent Office 2,856,075
Patented Oct. 14, 1958

2,856,075

FILTER

Rudolf Kahl, Essen, Germany

Application July 12, 1955, Serial No. 521,544

8 Claims. (Cl. 210—234)

The invention relates to filter arrangements for the treatment of liquids or gases and more especially to filters of the type comprising a filter body exchangeably arranged in a housing.

In exchanging the filter bodies charged with impurities, it frequently happens that parts of the deposited impurities become detached and fall into the filter, whence they pass into the discharge duct and again contaminate the filtered material.

The invention has for its objects to develop a filter arrangement in which the connection to the discharge duct is broken before the filter body is removed. A further object of the invention is to provide means to facilitate the lifting of the filter body from its seat, on which it has become firmly lodged during operation.

In accordance with the invention, with a view to achieving these objects, there is provided to hold the filter body fast in the operative position a screw member which so extends through a screwthreaded aperture in an intermediate bottom of the filter housing that the screw member can be used in one position to hold the filter body fast and in the other position to shut off the aperture in the intermediate bottom from the discharge duct of the housing.

It is thus possible to break the connection of the filter space to the discharge duct before the removal of the filter body without the aid of a special shut-off device, since the same screw member is employed to shut off the discharge duct as to hold the filter body fast in the operative position.

In accordance with a further feature of the invention, the screw member is provided with a longitudinal bore through which a pin or stud can be introduced to press the filter off its seat. The pressing action may be exerted, in accordance with the invention, by means of a screw cap or the like screwed on to the downwardly extending screwthreaded end of the screw member fitted in the inverted position.

In the accompanying drawings,

Figure 1 is a section through a filter constructed in accordance with the invention, and Figure 2 is a section through a part of the arrangement according to Figure 1 after the reversal of the screw member in the filter body.

The filter illustrated in the drawings comprises a substantially pot-shaped housing 1 in which an insert 2 preferably tapering substantially conically in the downward direction and forming a double jacket is provided. The liquid to be filtered is introduced through the branch tube 3 and is withdrawn through the branch tube 4 after the impurities and/or solid bodies have been separated from the liquid. A suitable medium for cooling or heating the filter may be passed through the jacket space 5.

Provided in the lower part of the insert 2 is an annular projection 6 extending in a circle, which is positioned adjacent a substantially conical intermediate bottom 7, which opens in the discharge duct 4 through the screwthreaded apertured member 8 connected or welded to the underside of the intermediate bottom 7.

Mounted on the projection, with the interposition of a soft packing or the like is the bottom 11 of the filter body 12, the said bottom here being externally fashioned as a ring 10. The pressing force which must be exerted by the bottom ring 10 on the projection 6 for the sealing is produced by the screw member or plug 13, the upper screwthreaded part 14 of which engages in a nut 15 secured to the filter bottom 11. The nut 15 is positioned above the intermediate bottom 7 in vertical alignment with the member 8, and has an interior diameter larger than that of the nut 15. The member 8 coacts with the nut or member 15 to provide a depending threaded socket of different internal diameter and which extends from opposite sides of the intermediate bottom 7 for alternately or interchangeably receiving corresponding end portions of the plug 13. Provided midway along the screw member 13 is a double flange 16, which bears through a soft packing 17 against the short tube 18, which extends through the double bottom of the filter housing 1.

The filter 12 is designed as a double-jacketed cylinder, and consists, for example, of expanded metal, perforated sheet metal, wire gauze or the like and can be provided internally and externally with a covering consisting of a suitable filtering material. The two walls of the filter body are braced by cross members 19, but in such manner that a continuous cavity remains free, through which the filtered liquid can flow down.

If the filter becomes so covered with impurities in the course of its operation that the apparatus must be cleaned, the admission of liquid is interrupted and the screw member 13 is first slackened. Thereafter it is inverted and screwed in again, so that its opposite screwthreaded end 20 engages in the screwthreaded apertured member 8 in the intermediate bottom 7, the other flange 16 thus bearing tightly against the short tube 18 in the filter bottom. This position of the screw member 13 is indicated in Figure 2. As will be seen, the communication or connection between the discharge duct 4 and the space above the intermediate bottom 7 is thus broken or closed, so that when the filter body is then lifted out, any parts of the residue falling from the filter cannot enter the filtered liquid in the discharge duct 4. The unfiltered liquid which has remained in the filter space may be removed through the bore or channel 21 together with the filter residue, or be added to, without being able to enter the filtrate pipe.

Crystallisation or other processes resulting in the deposition of solids on the filter body frequently occur within the filter, so that such solids cannot readily be removed from the filter housing, if at all. In order that the filter 12 may also be readily lifted from its seat in such cases, there is introduced through the axial bore 21 in the screw member 13 a pin 22 which applies upward pressure against the filter bottom 11. In addition, there is screwed on to the now downwardly directed smaller screwthreaded end 14 of the screw member 13 a nut 23 which is connected to a hand lever 24. The pin 22 can then be pushed up by means of the screw cap 23, the filter thus being lifted from its seat 6, as will be seen from Figure 2. The filter can thereafter readily be removed from the housing and cleaned.

When the filter is re-introduced, the pin 22 and the nut 23 are first removed and the screw member 13 is thereafter screwed into the position illustrated in Figure 1 until the bottom ring 10 of the filter 12 again bears tightly against the seat 6.

The filter is then ready for further filtering work.

The interruption of the filtering operation by the removal and cleaning or replacement of the filter body in the subject of the application is substantially shorter than in the known filter constructions, while no detriment to the filtering operation has to be tolerated.

As a closure for the filter housing 1, a lid 25 is provided, which is pivotally connected to the housing at 26 and is pressed by closure means not shown in the drawing against the upper edge 28 of the filter housing through a packing 27.

In the drawings, the filter body 12 is illustrated as a hollow cylinder, the inner and/or outer sides of which are made permeable and are covered with filter cloth or the like. Alternatively, there may be provided on the bottom 11 of the filter body a series of parallel double walls which may be either flat or bent and the cavity of which opens into the space below the filter bottom 1. It is also possible to provide on the filter bottom 11 tubes, for example plain tubes or the like, as carriers for the filter cloth or the like.

What I claim is:

1. A filter including in combination a housing having an intermediate bottom spaced above the bottom of the housing, said bottom having centrally aligned openings, said intermediate bottom having an annular seat, a filter body engaging said seat, said housing having an inlet duct and a spaced outlet duct, said outlet duct communicating with the housing between the bottom and the intermediate bottom, said filter body having a depending socket extending through the openings in said intermediate bottom and provided with interiorly threaded upper portion above said intermediate bottom and an interiorly threaded end portion below said intermediate bottom and of larger diameter than the upper threaded portion, said socket having a passage for communicating the space in the housing above the intermediate bottom with said outlet duct, and a plug having externally threaded end portions of different diameters arranged to be interchangeably connected to said socket so that, when one end of the plug is threadedly connected to the socket, it maintains the filter in firm sealing engagement with its seat, said plug, when the opposite end thereof is threadedly connected to said socket, closing the passage communicating the housing with the outlet duct so as to prevent the discharge of the liquid through said outlet duct.

2. A filter, as called for in claim 1, in which a tapered tubular insert is positioned between the inner wall of the housing and the filter body to provide a space for receiving means for controlling the temperature of the filter body.

3. A filter, as called for in claim 1, in which the outlet duct is positioned below the inlet duct.

4. A filter, as called for in claim 1, in which said plug has an axial through bore registering with said socket, and a tool is insertable in said bore to facilitate the withdrawal of the filter from the housing.

5. A filter, as called for in claim 4, in which means are provided for detachably connecting the tool to an end of said plug.

6. A filter, as called for in claim 1, in which the plug has an external annular shoulder engageable with the underside of the housing when the end portion of the plug of small diameter is connected to said socket so as to provide a seal between the plug and the housing.

7. A filter, as called for in claim 1, in which said plug has means engaging the underside of the housing when the end portion of the plug of larger diameter is connected to the socket for assisting in maintaining the filter body in a fixed position against said seat.

8. A filter including in combination a housing having an intermediate bottom spaced above the bottom of the housing, said bottoms having centrally aligned openings, a filter body in said housing and supported by said intermediate bottom, said housing having an inlet duct communicating with that part of said housing in which the filter body is arranged, and an outlet duct communicating with the free space between said bottoms, a member having its opposite end portions arranged to be interchangeably connected to said bottoms, said member when one of its end portions is inserted into the housing closing the centrally arranged opening of said housing and providing means for maintaining the filter body in a fixed position relative to said housing without closing said centrally arranged opening of said intermediate bottom, said member when the other end portion thereof is inserted into the housing, simultaneously closing said central aligned openings of said bottoms, in such a manner that the filter body may be removed from its position above said intermediate bottom without discharging any of the material through said outlet duct.

References Cited in the file of this patent

UNITED STATES PATENTS

| | | |
|---|---|---|
| 2,544,244 | Vokes | Mar. 6, 1951 |
| 2,658,624 | Redner | Nov. 10, 1953 |